(No Model.)

T. H. DIBBLE.
Fly Trap.

No. 242,438.        Patented June 7, 1881.

Witnesses.
Henry J. Heath
R. H. Wheeler

Inventor.
Theodore H. Dibble
by P. R. Voorhees
Atty.

United States Patent Office.

THEODORE H. DIBBLE, OF TRENTON, NEW JERSEY, ASSIGNOR TO THE DIBBLE MANUFACTURING COMPANY, OF SAME PLACE.

FLY-TRAP.

SPECIFICATION forming part of Letters Patent No. 242,438, dated June 7, 1881.

Application filed March 15, 1881. (No model.)

*To all whom it may concern:*

Be it known that I, THEODORE H. DIBBLE, of Trenton, in the county of Mercer and State of New Jersey, have invented a new and useful Improvement in Fly-Traps, which improvement is fully set forth and illustrated in the following specification and accompanying drawings.

The object of this invention is to provide a fly-trap which shall have a greatly-increased capacity for catching flies, compared with traps heretofore used of the same external or internal dimensions, and at the same time a cheaper trap, and one more quickly made than traps heretofore found in the market.

The invention consists, principally, in the manner of combining the outer case or cage proper with an entrapping entrance-cone, and in the manner of securing case and cone together, all of which will be hereinafter more particularly described.

Figure 1:
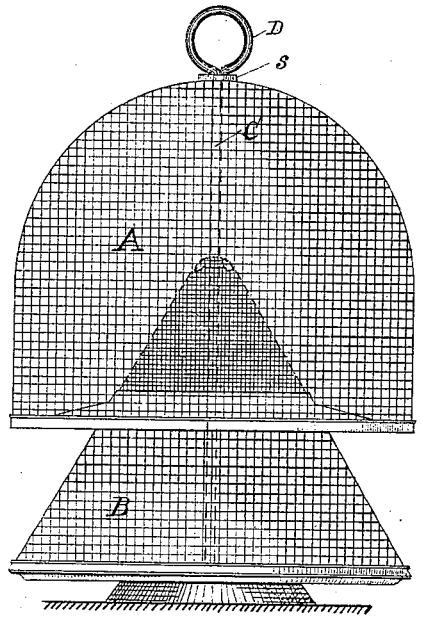
Figure 2:
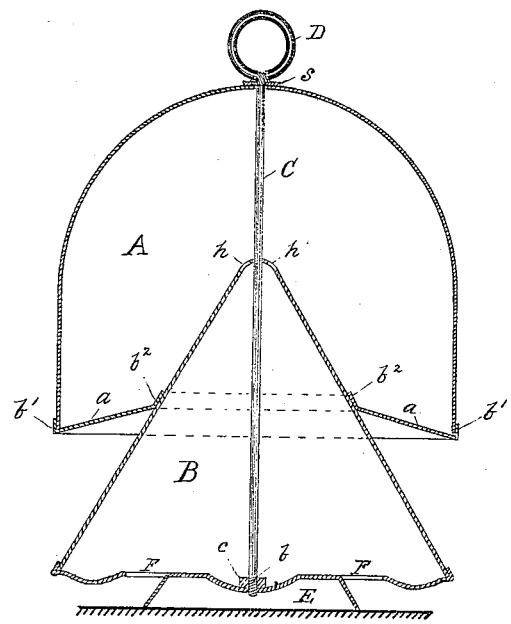

In the accompanying drawings, Figure 1 illustrates the trap entire; and Fig. 2, a vertical mid-section through the same, showing the rod which binds the case and cone together.

In the said figures, the letter A indicates the outer case or dome; B, the entrance-cone, partly inserted within the dome; C, a rod passing through both case and cone, and provided with a ring holder or handle, D, at its top, and with a shoulder, $s$, below said ring, and screw-threads $b$ at its bottom, which are screwed, first into the nut $c$, soldered, or otherwise secured, to the sub-base E of the trap. Said sub-base is provided with any suitable entrance for the flies between its attachments to the base proper, F, into which base the bottom rim of the cone B is fitted. The bottom of the dome or case A is fitted into an annular plate or ring-disk, $a$, and provided with suitable flanges upon its exterior and interior, the outer flange, $b'$, for the retention of the base of the dome A, and the inner flange, $b^2$, for giving a firm rest and support to the dome A and its base-plate $a$ upon the exterior sloping sides or breast of the cone B. The ring-disk or plate $a$ is preferably made to slope downward at a small angle, as seen in the drawings.

The method of setting this trap, and its mode of operation in catching the flies, will now be described.

The trap is baited by putting any suitable material, liquid or solid, upon the sub-base E, and more bait, also, upon or in the grooved base proper, F. The flies, being attracted by this bait, will fly to the trap and seek entrance under the trap, between the sub-base E and the base F, whence they will ascend the interior of the cone B, being attracted thither, after feeding upon the bait, by the light penetrating the wire-gauze or wire-cloth, of which said cone and its case A are made. The cone B is provided with holes (two or more) in its top, around the rod C, through which holes the flies will escape into the trap or cage proper—the dome A. Herein they are caught, and but few, if any, can escape therefrom. When said dome has become full of or much crowded with flies, and it is desired to empty it and reset it, the rod C is unscrewed from the nut $c$, and the cone and case detached, previous to which the flies may be killed by holding them over a fire or the fumes of any agent destructive to life; or they may be drowned by immersing the trap in water.

I do not confine myself to securing the rod C to a nut, $c$, or to securing the case and cone together by a central rod. The case, cone, and base may be secured by external radial straps or bands, if desired, instead of the more serviceable, neater, and cheaper device—a central rod.

The advantage that this trap possesses as a fly-catcher over the ordinary form of fly-trap, in which the cone is entirely within the case, is that the dead and disabled flies, as they fall to the bottom of the cage, do not obstruct the light shining through the cone, and thus deter other flies from entering through the cone. Where the cone is entered entirely within the cage the dead and disabled flies soon fill up so much of the narrow annular space between the cone and case that little or no light can shine through the meshes of the wire to the base and entrance below. Such traps therefore require frequent resetting or removal of the captured flies before they become filled to half their capacity.

The outer case, A, herein shown is that of a dome, and is preferably so shaped; but I do not confine myself to any special shape of case. It may be a cone, truncated or not, or a conoid or cylinder.

The ring-disk $a$ may be of any suitable material and have its under side polished or plated bright, or may be of glass or meshed wire, for the purpose of reflecting more light through the underlying wire-cloth of the cone upon the entrance below.

A very neat, cheap, durable, convenient, and most efficient fly-trap is thus provided, capable of catching more flies than any of the common forms of trap of equal interior dimensions before it becomes necessary to reset or empty the trap of the captured flies.

As of my invention I claim—

1. In a fly-trap, the combination of an outer case or cage, preferably a dome or cone, and a hollow entrance-cone inserted partly in said case through, and having its sides or breast braced by, a flanged annular disk, and its base projected below said case, both case and cone being detachably secured together and constructed of wire-cloth or translucent material, whereby light is transmitted directly through the cone below the case to the entrance of the trap, and is not obstructed by the accumulation of dead or disabled flies within the cage, substantially as set forth.

2. In combination with the outer case of a fly-trap, and an entrance-cone inserted partly within said case, as described, an outward and downwardly-sloping annular disk, forming the bottom of the case, whereon the dead and disabled flies fall, and thus keep the cone clear for the passage of light therethrough, substantially as and for the purposes set forth.

3. In combination with the outer case of a fly-trap, and an entrance-cone inserted partly within said case, as described, a double-flanged annular base-plate, partly closing said case, and forming an annular bottom therefor below it, and the breast of the cone braced by the inner flange of said bottom, substantially as and for the purposes set forth.

4. In combination with the case A and entrance-cone B, the base F, the annular disk or bottom $a$, and the rod C, said base and bottom being provided with upturned external flanges, whereby said case and entrance-cone are laterally braced and secured, substantially as set forth.

THEO. H. DIBBLE.

Witnesses:
W. F. YARD,
WM. E. FORD.